(12) United States Patent  (10) Patent No.: US 6,606,545 B1
McCall et al.  (45) Date of Patent: Aug. 12, 2003

(54) METHOD AND APPARATUS FOR FITTING GLOBAL LANDING SYSTEMS ON AIRCRAFT

(75) Inventors: Daryl L. McCall, Springville, IA (US); Donald A. Stratton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 118 days.

(21) Appl. No.: 09/382,381

(22) Filed: Aug. 24, 1999

(51) Int. Cl.⁷ .................................................. G06G 7/00
(52) U.S. Cl. .............................. 701/16; 701/4; 701/215; 342/357.08; 342/34
(58) Field of Search ............................ 701/16, 14, 17, 701/213, 11, 215, 3, 301, 4; 342/357.08, 357.02, 35, 34, 37, 38, 407, 357.03, 357.04; 340/951

(56) References Cited

U.S. PATENT DOCUMENTS

| | | | |
|---|---|---|---|
| 4,990,921 A | * 2/1991 | Chisholm | 342/35 |
| 5,193,064 A | * 3/1993 | Maki | 701/16 |
| 5,268,695 A | * 12/1993 | Dentinger et al. | 342/357 |
| 5,343,395 A | * 8/1994 | Watts | 701/16 |
| 5,359,332 A | * 10/1994 | Allison et al. | 342/357 |
| 5,561,432 A | * 10/1996 | Knight | 342/257 |
| 5,745,054 A | * 4/1998 | Wilkens | 340/972 |
| 5,745,863 A | * 4/1998 | Uhlenhop et al. | 701/14 |
| 5,831,570 A | * 11/1998 | Ammar et al. | 342/26 |
| 5,945,943 A | * 8/1999 | Kalafus et al. | 342/357 |
| 5,952,961 A | * 9/1999 | Denninger | 342/357.08 |
| 5,995,043 A | * 11/1999 | Murphy | 342/357.03 |
| 6,076,042 A | * 6/2000 | Tognazzini | 701/301 |

* cited by examiner

Primary Examiner—Thomas G. Black
Assistant Examiner—Ronnie Mancho
(74) Attorney, Agent, or Firm—Nathan O. Jensen; Kyle Eppele

(57) ABSTRACT

A global landing system (GLS) for retrofitting an aircraft having ILS systems, as well as autopilot or flight control computers. The GLS using horizontal and vertical guidance control points (GCPs) which are co-extensive with glideslope and localizer antenna locations, and correction lever arms representing the separation of such GCPs with on-board GPS antennas. A method of measuring such lever arm with an additional GPS receiver is also included.

19 Claims, 1 Drawing Sheet

METHOD AND APPARATUS FOR FITTING GLOBAL LANDING SYSTEMS ON AIRCRAFT

FIELD OF THE INVENTION

The present invention generally relates to global landing systems (GLSs) and more particularly relates to fitting aircraft with GLSs, and even more particularly relates to methods and apparatus of fitting GLSs on aircraft also having instrument landing systems (ILSs) and/or autopilots (A/Ps).

BACKGROUND OF THE INVENTION

In the past, ILSs have been used in a wide variety of airports, including military and commercial, as well as general aviation airports. These ILSs are well known in the art. However, with the advent of satellite navigation, avionics engineers are endeavoring to expand the availability of electronically aided landing systems to smaller airports, especially those previously unsupported with ILS, and to enhance the precision of approaches at airports already equipped with ILS. Many new aircraft are being delivered today with integrated multi-mode receivers on-board. These multi-mode receivers include receivers for receiving terrestrially transmitted ILS signals, as well as satellite transmitted GPS signals. They are typically integrated with the A/Ps or flight control computers (FCCs) on these new aircraft. Typically, the A/Ps and the ILS receivers require careful integration to assure proper use of glideslope and localizer deviation signals provided by the ILS receiver. Each model of aircraft is required to be separately certified by aviation regulators because of the peculiarities associated with each aircraft type and each receiver/antenna installation. Consequently, the cost of retrofitting new GLSs to existing aircraft can be expensive, especially if changes are required to be made in the A/P software which require recertification. Others have proposed various schemes for integrating GPS receivers with ILS receivers, for the purpose of reducing the recertification requirements.

While these GPS/IILS integration and retrofitting techniques may have many advantages in particular uses, they also have significant drawbacks. One common drawback of these designs is that they have not fully addressed the requirements for high precision in determining and processing glideslope and localizer deviation signals, especially during the final stages of approach and landing. At these stages, the requirements for precision become acute, and errors of position determination on the order of the length of the aircraft itself can be critical.

Consequently, there exists a need for improved methods and apparatuses for retrofitting GLSs into aircraft previously fitted with ILSs and A/Ps or FCCs.

SUMMARY OF THE INVENTION

It is an object of the present invention to provide an aircraft with a high precision global landing system.

It is a feature of the present invention to utilize predetermined guidance control points on the aircraft.

It is an advantage of the present invention to enable the precise computation of glideslope and localizer deviation signals within the GLS system.

It is another object of the present invention to provide a cost-effective method for determining and calibrating these guidance control points and the systems using them.

It is another feature to utilize a method of simultaneously measuring, with GPS receivers, the displacement of ILS receiver antennas from installed GPS antenna locations on the aircraft.

It is another advantage of the present invention to provide a quick and cost-effective method for establishing the guidance control points and the necessary corrections resulting from the frequent separation of GPS antennas, which are often midship and on the top of the aircraft, from ILS antenna locations, which are often in the nose or tail sections.

The present invention is an apparatus and method for retrofitting GLSs on aircraft previously fitted with ILSs and A/Ps or FCCs, which is designed to satisfy the aforementioned needs, provide the previously stated objects, include the above-listed features and achieve the already articulated advantages. The present invention is carried out in an "antenna separation error-less" manner in a sense that the errors introduced by the physical separation of GPS antennas from glideslope and localizer antennas have been greatly reduced.

Accordingly, the present invention is a GLS which uses guidance control points and the separation of these points from installed GPS antennas, to generate and utilize precise glideslope and localizer deviation signals.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
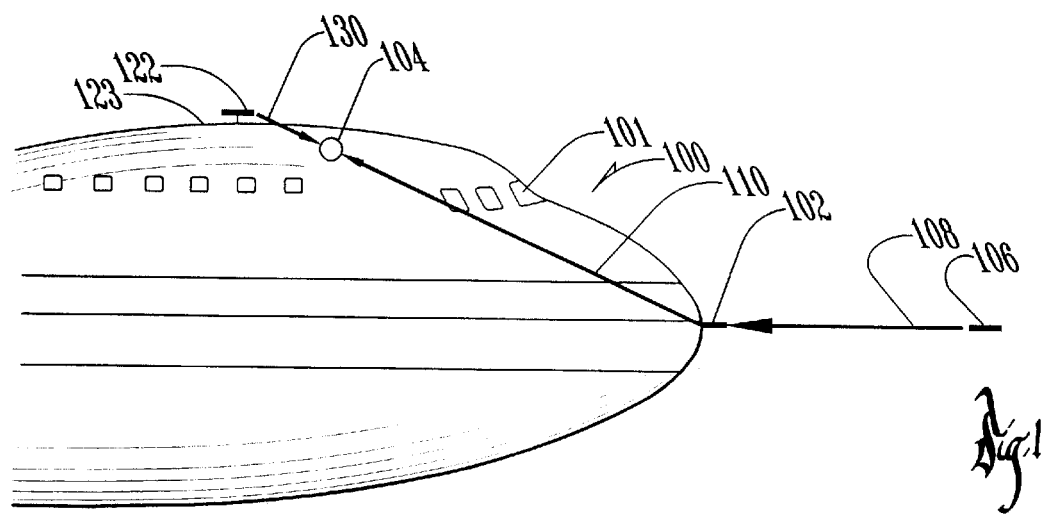
FIG. 1 is a simplified elevation view diagram of the system and environment of the present invention, which includes bold lines having heavy arrow tips thereon to designate lever arm correction vectors used by the present invention and measured in accordance with the techniques of the present invention.

Now referring to the drawings, wherein like numerals refer to like matter throughout, there is shown in FIG. 1 an aircraft right side or elevation view, generally designated 100, having a vertical guidance point 102 and a GPS horizontal survey antenna 122 disposed directly above horizontal guidance point 123. The vertical guidance point 102 is defined herein as the phase center of the glideslope antenna. The horizontal guidance point 123 is defined herein as the phase center of the localizer antenna. However, for various reasons, other locations may be used for the guidance point. Such other points are intended to be included within the present invention. The description herein focuses upon nose-mounted glideslope antennas and top and aft mounted localizer antennas because it is believed that many of the features and advantages of the present invention are particularly well suited for use under such conditions. However, it should be understood that other ILS antenna placements are equally applicable, and they are intended to be included within the scope of the present invention. Similarly, the GPS receivers are used herein as an example of various other wide area navigation systems which could also be used, such as GLONASS, LORAN etc. All of these various navigation systems are intended to be included within the scope of the present invention. Similarly, ILS landing systems are described herein as merely an example. The present invention could be adapted to work with microwave landing systems (MLS) or any other similar substitute. All of such various possible landing systems are intended to be included within the scope of the present invention. Also shown in FIG. 1 is aircraft windscreen 101 and right side GPS antenna 104, which is coupled to the on-board GLS, A/P, inertial reference system (IRS) and other similar navigation and flight control systems (not shown). GPS vertical survey antenna 106 is shown disposed a distance denoted by vertical survey offset vector 108 from vertical guidance point 102. Often it would be difficult to place the GPS vertical survey antenna 106 directly at the vertical guidance point 102. This is in contrast to the GPS horizontal survey antenna 122, which often would be readily deployable over horizontal guidance point 123. It should be understood that in some installations, GPS horizontal survey antenna 122 and horizontal guidance point 123 may be separated by a distance, which would be treated identical to vertical survey offset vector 108 with respect to GPS vertical survey antenna 106 and vertical guidance point 102. Horizontal lever arm correction vector 130 is shown as a bold line with a heavy arrow tip, and it represents the separation between horizontal guidance point 123 and right side GPS antenna 104.

Figure 2:
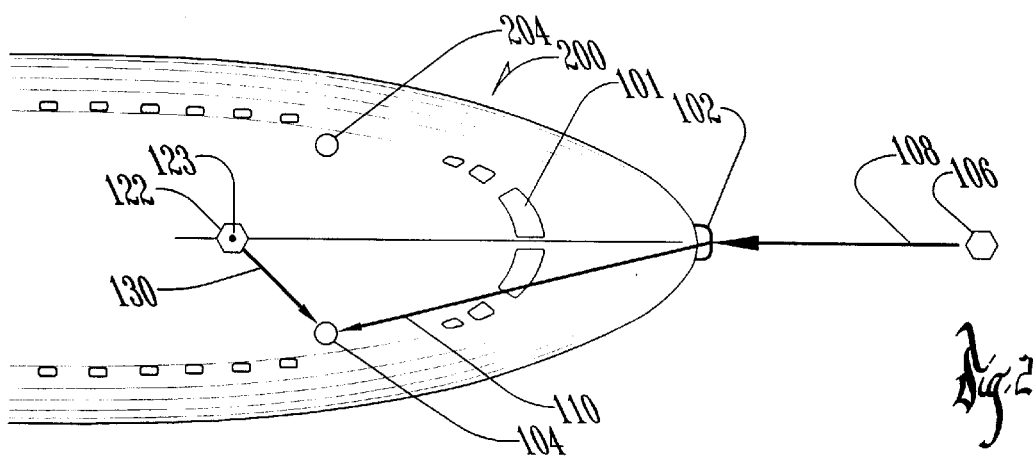
FIG. 2 is a simplified top or plan view of the system and environment of the present invention, which includes bold lines having heavy arrow tips thereon to designate lever arm correction vectors used by the present invention and measured in accordance with the techniques of the present invention.

Now referring to FIG. 2, there is shown a top or plan view, generally designated 200, of the present invention, which shows a left side GPS antenna 204. In a typical GPS installation, there may be one or more GPS antennas disposed at different locations on the top of the aircraft. The existence and location of any such additional GPS antennas is a matter of designer's choice, and it should be expected that numerous variations will be common. GPS horizontal survey antenna 122 is more clearly depicted as being positioned directly centered over horizontal guidance point 123.

In operation, the apparatus and method of the present invention could function as follows:

An aircraft is provided with a glideslope antenna disposed, for example, in the nose of the aircraft, the glideslope receiver is used for determining vertical deviation signals from a predetermined glideslope, these deviation signals are provided, for example, to an A/P for use in generating command signals to manipulate the aircraft controls and control surfaces. The A/P is configured to receive and use these glideslope deviation signals, which are representative of the deviations glideslope antenna at the known location in the nose, (this is the vertical guidance point 102) with respect to the predetermined glideslope path.

A GPS receiver is used to determine the position of the aircraft, right side GPS antenna 104 is used to determine vertical deviation. However, right side GPS antenna 104 is not co-extensive with vertical guidance point 102. Consequently, errors can arise because of the separation. These errors become increasingly critical with larger separations and with continued approach to the runway. Instead of changing the A/P software to handle the separation, (which requires recertification), the GLS system, of the present invention, can use the concepts of vertical guidance point 102 and vertical lever arm correction vector 110 to address the errors introduced by this physical separation. The GLS system can use these concepts to generate vertical deviation signals which more accurately depict the attitude and orientation of the aircraft, without requiring a change in the A/P software and its concomitant re-certification requirements. Well-known techniques of position determination with vector addition, subtraction and transformations can be utilized. In many situations it will be difficult to accurately generate the precise dimensional details of these vectors, such as vertical lever arm correction vector 110 and horizontal lever arm correction vector 130.

In a preferred method of the present invention, a GPS receiver is disposed at the guidance point, such as vertical guidance point 102, and this GPS receiver is used to simultaneously measure the position at vertical guidance point 102 and at the installed GPS antenna, such as right side GPS antenna 104. Known GPS position techniques, such as use of ECEF position vectors, GPS carrier phase vectors, or other known techniques used in aviation or terrestrial surveying, may be employed to precisely determine the separation. This calibration or measurement is done once at the time the aircraft is being retrofit with the GLS system. In some situations, the GPS vertical survey antenna 106 may not be co-located with vertical guidance point 102. Then a known survey offset is used, such as vertical survey offset vector 108. The discussions above relating to glideslope deviation signal, glideslope antennas, and vertical guidance point 102 are representative of an analogous situation involving horizontal deviation signals, localizer antennas and horizontal guidance point 123.

Numerous methods of computing vertical lever arm correction vector 110 and horizontal lever arm correction vector 130 can be imagined. One possible scheme could be as follows:

Assume the positions at each antenna are represented by the following vectors:

$$P_{Survey\_1} P_{Survey\_2} P_{GPS\_Right} P_{GPS\_Left}$$

where each of these vectors can be represented as three orthogonal constituents, such as $X_{Survey\_1}$, $Y_{Survey\_1}$, and $Z_{Survey\_1}$.

The lever arm corrections $R_{vert}$ and $R_{Horz}$ for the right-side GPS antenna would be computed as follows:

$$P_{GPS\_Right} = R_{Vert} + R_{Survey\_Offset} + P_{Survey\_1}$$

$$R_{Vert} = P_{GPS\_Right} - R_{Survey\_Offset} - P_{Survey\_1}$$

$$P_{GPS\_Right} = R_{Horz} + P_{Survey\_2}$$

$$R_{Horz} = P_{GPS\_Right} - P_{Survey\_2}$$

Similar computations using well-known vector mathematics techniques may be performed for the left-side antenna. These positions may be high accurate ECEF position vectors or GPS carrier phase vectors.

The lever arm data for the vertical guidance point 102 and the horizontal guidance point 123 could then be programmed in an aircraft personality module (APM), which are known in the art, and made available to the GLS precision approach navigator (PAN), which are known in the art, or the data could be directly programmed into the PAN. The details of various ways that the lever arm correction vectors 110 and 130 are used are a matter of design choice and are expected to vary widely, while still remaining within the scope of the present invention. One such approach is to perform the computations and any associated CRC check and APM programming within the GPS receiver, which typically is designed to support such flight control computations.

It is thought that the method and apparatus of the present invention will be understood from the following description, and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An apparatus comprising:
   a first positioning system receiver, on an aircraft for generating positioning system position signals representative of positional characteristics of said aircraft;
   a first positioning system antenna at a first positioning system antenna location on said aircraft;
   a landing system receiver for generating deviation signals representative of a deviation of said aircraft with respect to a predetermined landing system vector;
   a landing system antenna having a phase center at a first landing system antenna location; and,
   means for generating enhanced position signals which are representative of a deviation of said first landing system antenna location on said aircraft with respect to said predetermined landing system vector, wherein said enhanced position signals are further representative of said positioning system position signals and a vector representative of a separation characteristic between said first positioning system antenna location and said first landing system antenna location.

2. An apparatus of claim 1 wherein said means for generating enhanced position signals is a computer processor executing predetermined computer software.

3. An apparatus of claim 2 further comprising:
   means for controlling said aircraft in response to said deviation signals.

4. An apparatus of claim 1 wherein said landing system receiver is a glideslope receiver.

5. An apparatus of claim 1 wherein said landing system receiver is a localizer receiver.

6. An apparatus of claim 1 wherein said landing system receiver is a microwave landing system receiver.

7. An apparatus of claim 1 wherein said vector representative of a separation is determined from a survey positioning system receiver having a survey antenna disposed at a predetermined distance from said first landing system antenna location.

8. An apparatus of claim 1 wherein said first positioning system receiver is a GLONASS receiver.

9. An apparatus of claim 2 wherein said computer processor is a processor in said first positioning system receiver.

10. An apparatus of claim 1 wherein said positioning system receiver is a GPS receiver.

11. An apparatus of claim 2 wherein said computer processor is a processor in an inertial reference system.

12. An apparatus of claim 2 wherein said computer processor is a processor in said means for controlling said aircraft.

13. A method of providing signals representative of a deviation from a predetermined flight path, comprising the steps of:
    providing a three dimensional geo-referenced positioning system having an antenna at a first location on an aircraft,
    using said positioning system to generate a deviation signal representative of a deviation of a second location on said aircraft with respect to a predetermined flight path.

14. A method of claim 13 wherein said second location and said first location are separated by a first known distance.

15. A method of claim 14 wherein said first known distance is measured using a second three dimensional geo-referenced positioning system disposed at a second known distance from said second location.

16. A method of claim 15 wherein said second known distance is a physically measured quantity.

17. An apparatus comprising:
    first means for providing a first signal representative of a three dimensional geo-based position of a first location in a frame of reference of an aircraft;
    second means for providing a second signal representative of a three dimensional geo-based position of a second location in said frame of reference of an aircraft;
    means for determining a location separation distance between said first location and said second location;
    means for generating a deviation signal of said second location with respect to a predetermined aircraft flight path vector, wherein said deviation signal is a function of said first signal and said location separation distance.

18. An apparatus of claim 17 wherein said means for determining a location separation distance is a computer processor included in said second means for providing a second signal representative of a three dimensional geo-based position.

19. An apparatus of claim 18 wherein said means for generating a deviation of said second location with respect to a predetermined aircraft flight path vector is a computer processor included in said first means for providing a first signal representative of a three dimensional geo-based position of a first location in a frame of reference of an aircraft.

* * * * *